(12) United States Patent
Grisey et al.

(10) Patent No.: US 12,511,948 B2
(45) Date of Patent: Dec. 30, 2025

(54) METHOD FOR MANAGING THE ACCESS OF A USER TO A MOTOR VEHICLE

(71) Applicant: Continental Automotive Technologies GmbH, Hannover (DE)

(72) Inventors: Christophe Grisey, Toulouse (FR); Cédric Boudet, Toulouse (FR); Vincent Jamart, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 135 days.

(21) Appl. No.: 18/380,301

(22) Filed: Oct. 16, 2023

(65) Prior Publication Data
US 2024/0144738 A1 May 2, 2024

(30) Foreign Application Priority Data
Oct. 26, 2022 (FR) .......................... 2211114

(51) Int. Cl.
G07C 5/00 (2006.01)
B60R 25/24 (2013.01)
G06F 21/44 (2013.01)
G07C 9/00 (2020.01)
H04L 41/0816 (2022.01)
H04W 4/40 (2018.01)

(52) U.S. Cl.
CPC .................... G07C 5/008 (2013.01)

(58) Field of Classification Search
CPC . G07C 5/008; G07C 9/00309; H04L 41/0816; H04L 41/0889; B60R 25/245; H04W 4/40; G06F 21/44; G06F 21/604
USPC ........................................ 701/31.4
See application file for complete search history.

(56) References Cited

U.S. PATENT DOCUMENTS

| 2015/0291126 | A1* | 10/2015 | Nicholls | B60R 25/2054 701/49 |
| 2021/0058252 | A1* | 2/2021 | Jung | H04L 9/14 |
| 2021/0181294 | A1* | 6/2021 | Kusumoto | B60R 25/245 |
| 2021/0241551 | A1* | 8/2021 | Loeshelle | G07C 9/00182 |
| 2021/0368472 | A1* | 11/2021 | Ohashi | G01S 13/765 |

FOREIGN PATENT DOCUMENTS

FR 3101436 A1 4/2021

* cited by examiner

Primary Examiner — Tyler D Paige
(74) Attorney, Agent, or Firm — Buchanan Ingersoll & Rooney P.C

(57) ABSTRACT

A method for managing functions of a motor vehicle for a user of the vehicle, notably including the steps of parameterizing the secondary computer with the configuration determined, of detecting at least one event corresponding to a triggering beacon or to a message received from the main computer, of obtaining, in the memory area of the secondary computer, at least one script associated with the at least one triggering beacon and/or with the at least one message for which an event has been detected, of the secondary computer executing the at least one script obtained.

10 Claims, 3 Drawing Sheets

METHOD FOR MANAGING THE ACCESS OF A USER TO A MOTOR VEHICLE

CROSS REFERENCE TO RELATED APPLICATIONS

This application claims priority to French Patent Application No. 2211114, filed Oct. 26, 2022, the contents of such applications being incorporated by reference herein.

FIELD OF THE INVENTION

The present invention pertains to the automotive field and relates more particularly to a method for managing the access of a user to a motor vehicle.

BACKGROUND OF THE INVENTION

Nowadays, it is known practice to use a device carried by a user of a vehicle to make it possible for them to unlock the access to the passenger compartment of said vehicle from the outside and/or to trigger welcome services (lights, adjustments to the seats, etc.). The device may be a key, a fob or, increasingly often, the smartphone of the user.

In a known, old and widespread solution, the communication between the device and the vehicle is carried out over a wireless link of low-frequency (LF) type in order to detect the device and then of radio-frequency (RF) type in order to authenticate the device. A more recent solution uses a wireless link of Bluetooth® or Bluetooth Low Energy® (BLE®) type. Finally, another, even more recent, solution is based on ultra-wide band (UWB) communication.

In this latter solution, it is known practice to use a main computer and a plurality of secondary computers. The main computer is on board the vehicle and its role is to control each secondary computer. Each secondary computer is placed in a different location in the vehicle, for example at each corner of the vehicle and at its center, and comprises an antenna making it possible to communicate with the device over a UWB communication link.

The UWB communication protocol makes it possible, in a known manner, to communicate in two modes: a so-called "passive" communication mode and a so-called "active" communication mode. In the passive mode, a secondary computer transmits signals to its immediate environment and receives reflected signals in order to be able to detect the presence of an obstacle, which may be an object or a person, notably the user of the vehicle carrying the device. This mode is called passive because there is no exchange of data between the computer and the obstacle. In the active mode, a secondary computer communicates with the device in order to exchange data, notably in order to authenticate it.

In this prior art solution, the main computer controls each secondary computer in order to place it either in the passive mode or in the active mode. Each secondary computer is programmed to execute a set of predetermined tasks according to whether it has been placed in the passive mode or in the active mode by the main computer.

Thus, in this solution, the main computer has to modify the operating mode of each secondary computer, one by one, so that it may switch to the other mode, which may prove to be time-consuming and therefore not very effective when functions of the vehicle have to be activated as quickly as possible (unlocking, welcome, etc.), which is a drawback. Then, statically programming each secondary computer in the passive mode or the active mode does not make it possible for the secondary computer to offer new functionalities and to send new data to the device apart from those which are programmed, which is another drawback.

A simple, reliable and effective solution which makes it possible to at least partially remedy these drawbacks would therefore be advantageous.

SUMMARY OF THE INVENTION

To this end, an aspect of the invention is first and foremost a method for managing functions of a motor vehicle for a user of said vehicle, said user carrying an authentication device making it possible to trigger said functions by communicating in the ultra-wide frequency band, notably from outside the vehicle, said vehicle comprising a main computer and a plurality of secondary computers, each secondary computer comprising a memory area in which a plurality of configurations is stored, each configuration defining a different operating mode while being identified by an identifier, each operating mode comprising using a passive and/or active mode of the ultra-wide frequency band, said method, which is implemented by at least one of the secondary computers, comprising the steps of:

receiving a configuration request sent by the main computer, said request comprising the identifier of a configuration, determining, in the memory area of said secondary computer, the configuration associated with the identifier received, parameterizing the secondary computer with the configuration determined, detect at least one event corresponding to a triggering beacon or to a message received from the main computer, obtaining, in the memory area of said secondary computer, at least one script comprising instructions in the passive and/or active mode which is associated with the at least one triggering beacon and/or with the at least one message for which an event has been detected, the secondary computer executing the at least one script obtained.

The configuration may use the UWB passive mode, the UWB active mode, or a combination of the UWB passive mode and the UWB active mode. The method according to an aspect of the invention thus makes it possible for the main computer to manage each secondary computer independently via a common request format, notably to determine a different operating mode for each secondary computer, which may then operate autonomously depending on the events detected. Each secondary computer may thus launch a predetermined script depending on a specific event. In addition, using configurations stored in the memory area of each secondary computer makes it possible, in particular, to avoid having to reparameterize said secondary computer in order to make it switch between the passive mode and the active mode or vice versa. Furthermore, using configurations stored in the memory area of each secondary computer advantageously makes it possible to use scripts mixing both the passive mode and the active mode. The two types of transmission/reception, passive and active, may both be used both to measure a distance or to evaluate a channel via a CIR (channel impulse response) measurement. Thus, managing these two types of requests jointly and centrally makes it possible to optimize (via the scripts) the services rendered to the client by potentially responding to several clients on the basis of a single UWB communication originating from a single request. This thus makes it possible to reduce the number of UWB communications, to decrease the battery consumption of the vehicle and of the device (smartphone or key fob) which may, standardly, have high consumption during the UWB reception phases. This also makes it possible to improve the response times of the functions served by the various clients as only one communication takes place.

Advantageously, the at least one event is detected on the basis of signals received in the ultra-wide frequency band.

Advantageously again, the signals received in the ultra-wide frequency band were sent by the device.

An aspect of the invention also relates to a computer program product characterized in that it comprises a set of program code instructions which, when they are executed by one or more processors, configure the one or more processors to implement a method as presented above.

An aspect of the invention also relates to a secondary computer for managing functions of a motor vehicle for a user of said vehicle, said user carrying an authentication device making it possible to trigger said functions by communicating in the ultra-wide frequency band, notably from outside the vehicle, said vehicle comprising a main computer and said secondary computer, the secondary computer comprising a memory area in which a plurality of configurations is stored, each configuration defining a different operating mode while being identified by an identifier, each operating mode comprising using a passive and/or active mode of the ultra-wide frequency band, the secondary computer being configured to:
  receive a configuration request sent by the main computer, said request comprising the identifier of a configuration,
  determine, in the memory area of said secondary computer, the configuration associated with the identifier received,
  be parameterized with the configuration determined,
  detect at least one event corresponding to a triggering beacon or to a message received from the main computer,
  obtain, in the memory area, at least one script comprising instructions in the passive and/or active mode which is associated with the at least one triggering beacon and/or with the at least one message for which an event has been detected,
  execute the at least one script obtained.

Advantageously, the secondary computer is configured to detect the at least one event on the basis of signals received in the ultra-wide frequency band.

Advantageously again, the secondary computer is configured to detect the at least one event on the basis of signals sent by the device in the ultra-wide frequency band.

An aspect of the invention also relates to a main computer for a motor vehicle, said main computer being configured to send, over a communication link, to a secondary computer, as presented above, of said vehicle, a configuration request comprising the identifier of a configuration, said configuration defining an operating mode, said operating mode comprising using a passive and/or active mode of the ultra-wide frequency band.

Advantageously, the main computer is configured to send configurations and/or scripts to a secondary computer.

An aspect of the invention also relates to a motor vehicle comprising a main computer as presented above and a plurality of secondary computers as presented above.

BRIEF DESCRIPTION OF THE DRAWINGS

Other features and advantages of aspects of the invention will become more clearly apparent on reading the description which follows. This description is purely illustrative and has to be read with reference to the appended drawings, in which.

DETAILED DESCRIPTION OF THE DRAWINGS

Figure 1:
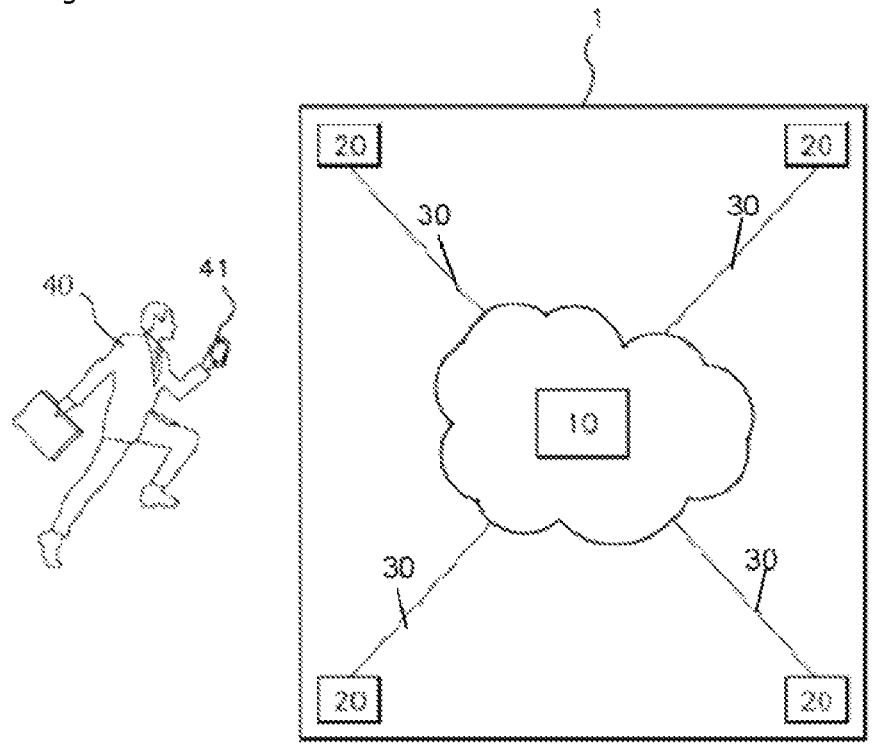
FIG. 1 schematically illustrates one embodiment of the system according to the invention.

FIG. 1 shows an example of a vehicle 1 according to an aspect of the invention.
Vehicle 1

The vehicle 1 comprises a main computer 10 and four secondary computers 20. As a variant, the vehicle 1 might comprise more or fewer than four secondary computers 20.

The main computer 10 is connected to the four secondary computers 20 by a communication network 30 which may be of wired or wireless type.
Main Computer 10

The main computer 10 is configured to send, via the communication network, to a secondary computer of said vehicle, a configuration request comprising the identifier of a configuration.

The configuration identifier makes it possible to identify a configuration stored in the memory area of a secondary computer 20. Each configuration defines an operating mode which involves the use of a passive and/or active mode of the ultra-wide frequency band by said secondary computer 20.

The main computer 10 is preferably configured to send configurations and/or scripts to each of the secondary computers 20 in order to update them.

The main computer comprises a processor which is able to implement a set of instructions making it possible to carry out these functions.
Secondary Computer 20

Each secondary computer 20 makes it possible to manage functions of the vehicle 1 for a user 40 of said vehicle 1. The functions may be triggered by the user 40 via an authentication device 41 and via a secondary computer 20, or indeed directly by the secondary computer 20, or even by the main computer 10.

The device 41 is configured to communicate with the secondary computers 20 over an ultra-wide frequency band (UWB) communication link, notably from outside the vehicle 1. Conversely, each secondary computer 20 is configured to communicate with the device 41 over a UWB communication link, via an antenna 20A, and with the main computer 10 via the communication network 30, for example a network for wired communication of CAN bus type which is known per se.

Figure 2:
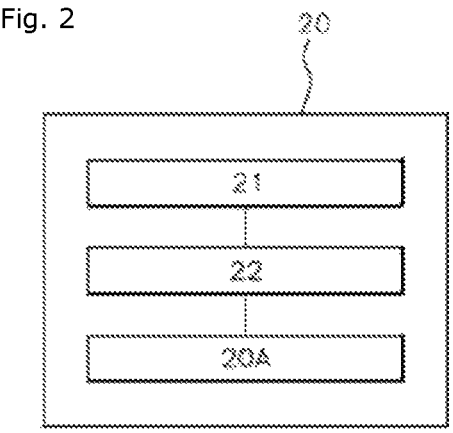
FIG. 2 schematically illustrates one embodiment of the secondary computer according to the invention.

FIG. 2 shows an example of a secondary computer 20 according to an aspect of the invention.

Each secondary computer 20 comprises a memory area 21 in which a plurality of configurations of said secondary computer 20 is stored.

Each configuration is characterized by an identifier and defines a different operating mode. Each operating mode uses the passive mode of the ultra-wide band or the active mode of the ultra-wide band or indeed a combination of said passive mode and said active mode. Each operating mode constitutes a state machine which may be executed by the secondary computer 20.

Each secondary computer 20 is configured to receive configurations and/or scripts sent by the main computer 10 in order to be updated.

Each secondary computer 20 is configured to receive a configuration request sent by the main computer 10 and comprising a configuration identifier.

Each secondary computer 20 is configured to determine, in its memory area 21, the configuration associated with the identifier received in the configuration request.

Each secondary computer 20 is configured to be parameterized with the configuration determined.

Each secondary computer 20 is configured to detect at least one event.

The event may correspond to a triggering beacon such as, for example, receiving a message sent in a UWB signal sent by the device 41 or indeed detecting, via UWB signals in the passive mode, the position of the device 41 in a predetermined area around the vehicle 1. The triggering beacon triggers the running of a script stored in the memory area 21.

The event may also be a message received from the main computer 10 which makes it possible to trigger a script comprising instructions in the predetermined passive and/or active mode.

Each secondary computer 20 is configured to obtain, in its memory area, at least one script comprising instructions in the passive and/or active mode which is associated with at least one triggering beacon and/or with at least one message for which an event has been detected.

Each secondary computer 20 is configured to execute the at least one script obtained.

Each secondary computer 20 comprises a processor 22 which is able to implement a set of instructions making it possible to carry out these functions.

Example of an Embodiment

Figure 3:
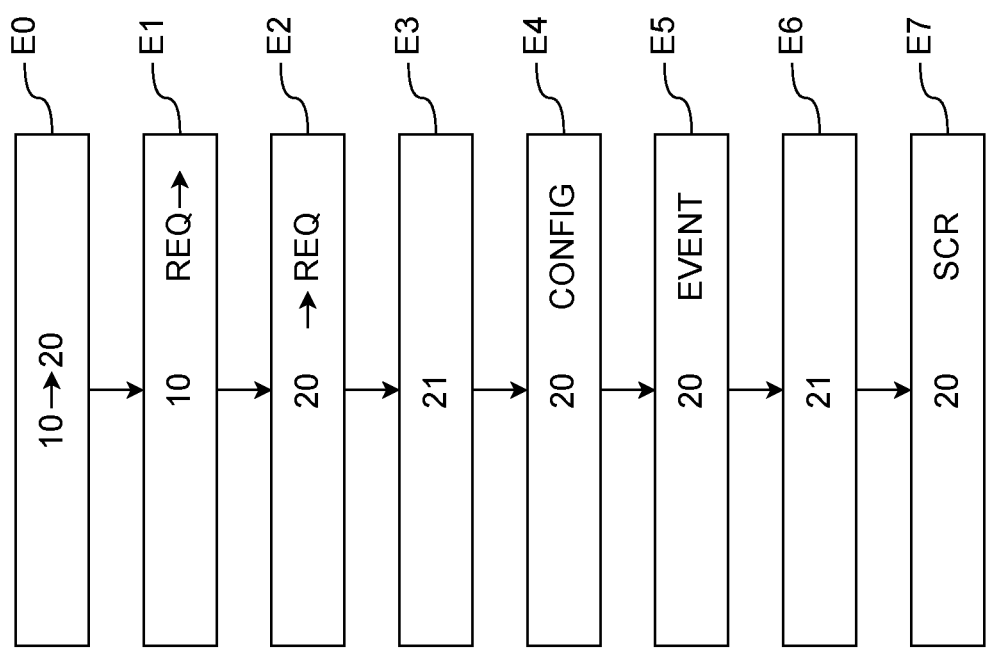
FIG. 3 schematically illustrates one embodiment of the method according to the invention.
Figure 4:
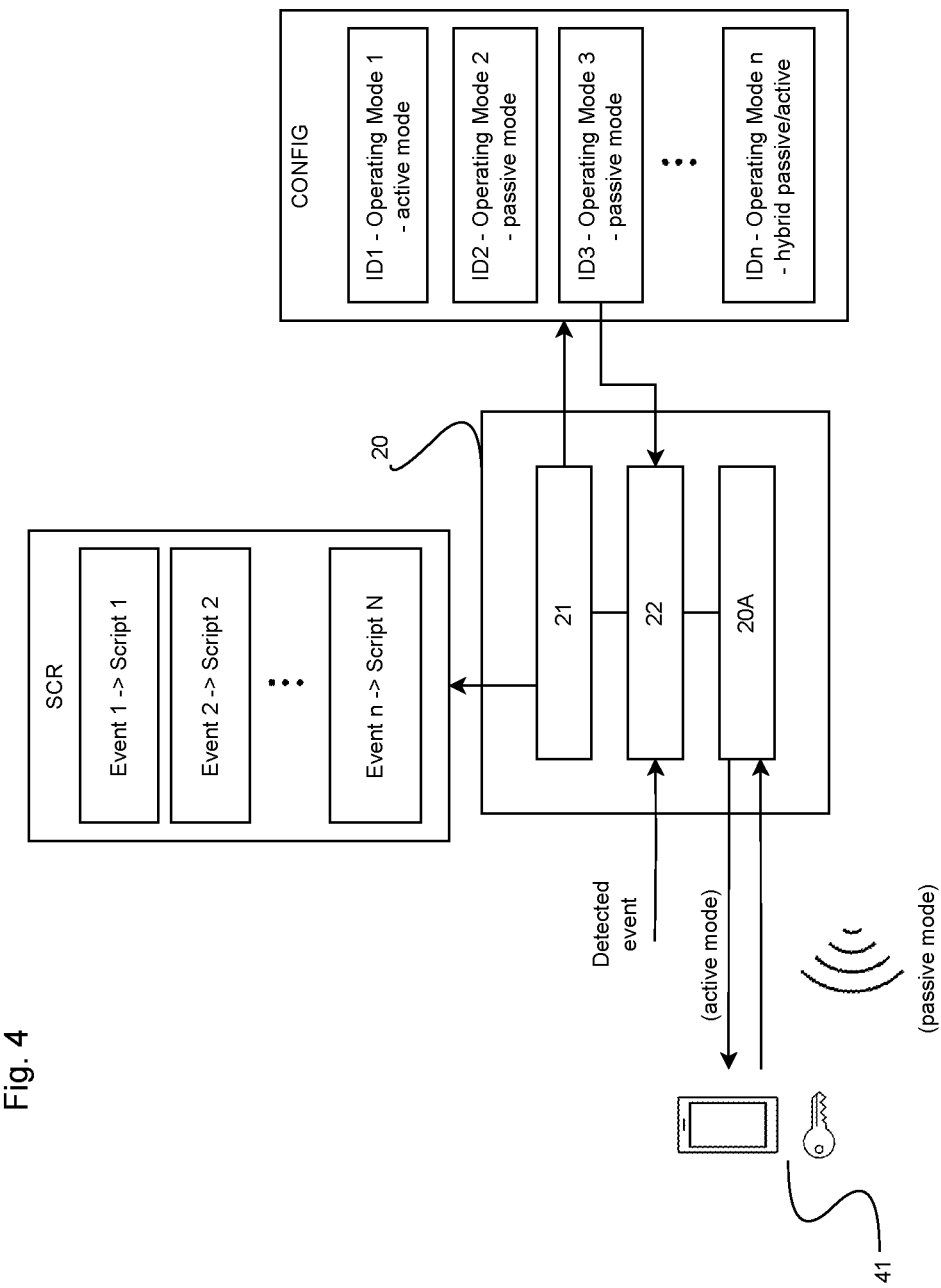
FIG. 4 schematically illustrates another embodiment of the secondary computer according to the invention.

Referring now to FIG. 3, in a preliminary maintenance step E0, the main computer 10 sends a plurality of configurations and scripts to each secondary computer 20, which receives them and stores them in its memory area 21.

In standard operation of the vehicle 1, the main computer 10 manages each secondary computer 20 independently in a step E1 by sending it, via the communication network 30, the identifier of a configuration in a configuration request REQ.

Each secondary computer 20 receives, in a step E2, the configuration request REQ sent by the main computer 10 and then determines, in its memory area 21, the configuration CONFIG associated with the identifier received in a step E3.

Each secondary computer 20 is then parameterized, in a step E4, with the configuration CONFIG determined.

When a secondary computer 20 detects, in a step E5, an event EVENT corresponding to a triggering beacon of a script stored in the memory area or to a message received from the main computer 10, said secondary computer 20 obtains, in its memory area 21, the associated script SCR comprising instructions in the passive and/or active mode in a step E6 and then executes said script SCR obtained in a step E7.

Thus, the secondary computer 20 no longer depends on the main computer 10 to react to an event; it will draw, from its memory area, the script which corresponds to the event detected, the script being able to switch the communication between the secondary computer 20 and the device 41 to the passive, enhanced passive (increased transmission frequency) or active ultra-wideband communication mode.

APPLICATION EXAMPLES

In the examples below, a plurality of configurations and a plurality of scripts have been stored in advance in the memory area 21 of each secondary computer 20.

First Example

In a first example, the main computer 10 sends a configuration request to one of the secondary computers 20 so that said secondary computer 20 operates in a first pure passive mode in which it transmits at low frequencies.

The secondary computer 20, thus parameterized, detects the device 41 by polling using UWB signals which it transmits, in a manner known per se. This detection is an event which corresponds to a triggering beacon which triggers an associated authentication script in two stages.

In a first stage, the script switches the secondary computer 20 to a second pure passive mode, at high frequencies, which makes it possible to eliminate the stationary objects, other than the user 40 of the device 41, in order to ensure that the device 41 is indeed an authentication device adapted to communicate with the vehicle 1, which is approaching or moving away from the vehicle 1.

In a second stage, the script switches the secondary computer 20 to a pure active mode in which said secondary computer 20 communicates with the device 41 in order to authenticate it.

Once authenticated, welcome functions of the vehicle 1 may, for example, be implemented, such as, for example, unlocking the opening elements of the vehicle 1, lighting, adjusting the seats according to the profile of the user, etc.

Second Example

In a second example, the main computer 10 sends a configuration request to one of the secondary computers 20 so that said secondary computer 20 operates in a pure passive mode with an already-authenticated device 41 carried by a user 40 of the vehicle 1.

When the secondary computer 20, thus parameterized, detects, by polling, using UWB signals which it transmits, that the device 41 is moving away from the vehicle 1 and that the opening elements of the vehicle 1 are not locked, this detection is an event which corresponds to a triggering beacon which triggers a script for dialog with the device 41.

In a first stage, the script switches the secondary computer 20 to a pure active mode in which said secondary computer 20 communicates with the device 41 in order to warn that the opening elements have not been locked. The user may then send a closure command to the secondary computer 20, which transmits it to the main computer 10, which then orders the opening elements to be locked.

In another example, a script may define an operating mode which involves the secondary computer 20 operating in a hybrid mode combining passive mode and active mode, without going through a triggering beacon or a message from the main computer 10 before each UWB mode change.

The method according to an aspect of the invention thus makes it possible for a main computer 10 to control a plurality of secondary computers 20 differently and independently on the basis of simple configuration identifiers, which make it possible to launch a state machine on each secondary computer 20, or indeed directly, on the basis of simple control messages without needing to reparameterize the processor 22 of each secondary computer 20 each time.

The invention claimed is:

1. A method for managing functions of a motor vehicle for a user of said vehicle, said user carrying an authentication device making it possible to trigger said functions by communicating in the ultra-wide frequency band, notably from outside the vehicle, said vehicle comprising a main computer and a plurality of secondary computers, each secondary computer comprising a memory area in which a plurality of configurations is stored, each configuration defining a different operating mode while being identified by an identifier, each operating mode comprising using a passive and/or active mode of the ultra-wide frequency band, said method, which is implemented by at least one of the secondary computers, comprising:

receiving a configuration request sent by the main computer, said request comprising the identifier of a configuration, determining, in the memory area of said secondary computer, the configuration associated with the identifier received, parameterizing the secondary computer with the configuration determined, detecting at least one event corresponding to a triggering beacon or to a message received from the main computer, obtaining, in the memory area of said secondary computer, of at least one script comprising instructions in the passive and/or active mode which is associated with the at least one triggering beacon and/or with the at least one message for which an event has been detected, said script being able to switch the communication between the secondary computer and the device to the passive or active ultra-wideband communication mode or to a hybrid mode combining passive mode and active mode, the secondary computer executing the at least one script obtained.

2. The method as claimed in claim 1, wherein the at least one event is detected on the basis of signals received in the ultra-wide frequency band.

3. The method as claimed in claim 2, wherein the signals received in the ultra-wide frequency band were sent by the device.

4. A non-transitory computer program product, comprising a set of program code instructions which, when they are executed by one or more processors, configure the one or more processors to implement a method as claimed in claim 1.

5. A secondary computer for managing functions of a motor vehicle for a user of said vehicle, said user carrying an authentication device making it possible to trigger said functions by communicating in the ultra-wide frequency band, notably from outside the vehicle, said vehicle comprising a main computer and said secondary computer, the secondary computer comprising a memory area in which a plurality of configurations is stored, each configuration defining a different operating mode while being identified by an identifier, each operating mode comprising using a passive and/or active mode of the ultra-wide frequency band, the secondary computer being configured to:

receive a configuration request sent by the main computer, said request comprising the identifier of a configuration, determine, in the memory area of said secondary computer, the configuration associated with the identifier received, be parameterized with the configuration determined, detect at least one event corresponding to a triggering beacon or to a message received from the main computer, obtain, in the memory area, at least one script comprising instructions in the passive and/or active mode which is associated with the at least one triggering beacon and/or with the at least one message for which an event has been detected, execute the at least one script obtained.

6. The secondary computer as claimed in claim 5, said secondary computer being configured to detect the at least one event on the basis of signals received in the ultra-wide frequency band.

7. The secondary computer as claimed in claim 6, said secondary computer being configured to detect the at least one event on the basis of signals sent by the device in the ultra-wide frequency band.

8. A motor vehicle comprising i) a main computer and ii) a plurality of secondary computers as claimed in claim 5, the main computer being configured to send, over a communication link, to the plurality of secondary computers, a) a configuration request comprising the identifier of a configuration, said configuration defining an operating mode, said operating mode comprising using a passive and/or active mode of the ultra-wide frequency band, and b) configurations and/or scripts.

9. A main computer for a motor vehicle, said main computer being configured to send, over a communication link, to a secondary computer of said vehicle, a configuration request comprising the identifier of a configuration, said configuration defining an operating mode, said operating mode comprising using a passive and/or active mode of the ultra-wide frequency band.

10. The main computer as claimed in claim 9, said main computer being configured to send configurations and/or scripts to a secondary computer.

* * * * *